Dec. 12, 1961  R. A. MAYNE  3,012,799
HUB
Filed July 12, 1957

INVENTOR.
ROBERT A. MAYNE
BY
HIS ATTORNEYS

United States Patent Office 3,012,799
Patented Dec. 12, 1961

3,012,799
HUB
Robert A. Mayne, 42 Forrer Road, Dayton, Ohio; Ruth D. Mayne, executrix of said Robert A. Mayne, deceased
Filed July 12, 1957, Ser. No. 671,444
6 Claims. (Cl. 287—52)

This invention pertains to a locking device adapted to be nonrotatably attached to a shaft, such as a hub, although not necessarily so limited.

Various ways of supporting a member on a shaft have been proposed and used in the past, as for example, a key, a flattened surface on the surface of the shaft, a set screw or a wedge, et cetera. In the copending Rifner application Serial No. 249,897, filed October 5, 1951 for Hub Assembly and Fastening Means, and now abandoned, teeth have been used for securing a member to a shaft. In the Rifner application, the teeth are forced into the surface of the shaft by a pulling action exerted upon the member having the teeth, which pulling action originates on the side of the shaft substantially diametrically opposite the teeth.

An object of this invention is to provide a cup-shaped member provided with an outwardly flaring wall adapted to force a toothed sector member into the shaft.

Other objects and advantages reside in the construction of parts, the combination thereof, the method of manufacture and the mode of operation, as will become more apparent from the following description.

Referring to the drawings, FIGURE 1 is a perspective view of the preferred embodiment of a device for locking a member to a shaft.

Figure 4:
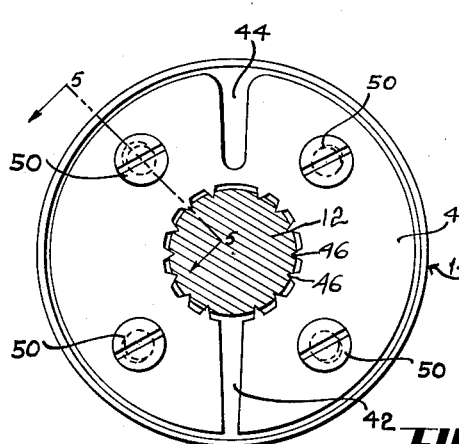

FIGURE 4 discloses a modification of a device for locking a member to a shaft.

Figure 5:
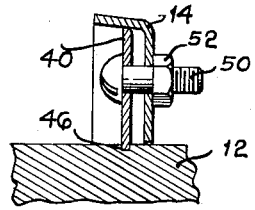

FIGURE 5 is a fragmentary, cross sectional view, taken substantially on the line 5—5 of FIGURE 4.

Figure 6:
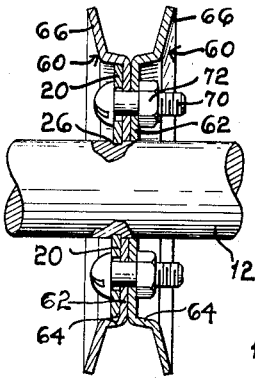

FIGURE 6 is a cross sectional view of another modification, wherein a pulley is secured to a shaft.

Figure 7:
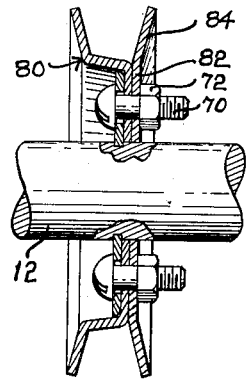

FIGURE 7 is another cross sectional view of another modification of a pulley secured to a shaft.

Figure 8:
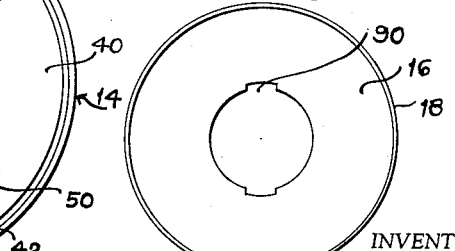

FIGURE 8 is a modification showing another part of the locking member.

The locking device disclosed herein may be used for securing to a shaft various types of mechanism, as for example, a hub for a blower wheel, a pulley, a fan, a gear, a cam, a clutch member or any other type of a device to be driven by the shaft or used in holding the shaft stationary. The preferred embodiment is used in association with a disc 10, as for example, the center disc of a blower wheel, that is mounted upon a shaft 12. The disc 10 has been merely shown for the purpose of illustration.

Attached to this disc 10 by spot welding or otherwise is a cup-shaped member 14 having a bottom 16 and an annular flange 18. The bottom 16 of the cup-shaped portion is provided with an aperture that is slightly larger or substantially equal to the diameter of the shaft 12. The annular flange 18 forms an obtuse angle with respect to the bottom 16. Due to the shape of the flange 18, it is adapted to withstand large radial forces.

A pair of arcuate sectors 20 are each provided with a convex outer marginal surface 22 and a concave surface 24, this concave surface 24 being provided with teeth 26. The ends of the sectors may be radially disposed. Holes 28 extend through the sectors 20. The radial distance from the point of the teeth 26 to the arcuate convex surface 22 is greater than the radial length of the bottom portion 16 from the shaft to the inner surface of the annular flange 18. When assembling the sectors 20 within the cup-shaped member 14, the holes 28 are aligned with corresponding holes in the bottoms 16 of the cup-shaped members 14. A bolt extends through the hole 28, through the hole in the bottom 16 of the cup-shaped member 14 and through the disc member 10. As the bolts 30 are tightened, so as to force the sector from the position shown in the upper half of FIGURE 2 into the position shown in the bottom half of FIGURE 2, the teeth 26 are forced to gouge into the periphery of the shaft 12. The teeth, being embedded in the shaft, lock the cup-shaped member 14 and the disc 10 to the shaft. The outer margin of the convex portion 22 is bevelled or rounded, as best seen in the margins 32 of the sectors 20, in FIGURE 2.

The teeth 26, upon being embedded into the surface of the shaft 12, function as keys in preventing relative rotation of the parts mounted on the shaft with respect to the shaft. This has been found to be both an efficient and an inexpensive method of manufacturing a hub that may be locked upon a shaft without the use of a key slot, without the use of a key, without the use of a set screw and without the use of one or more flattened surfaces on the shaft. The number of sectors 20 depends upon the particular requirements of the hub. One, two or more sectors may be used.

Figure 1:
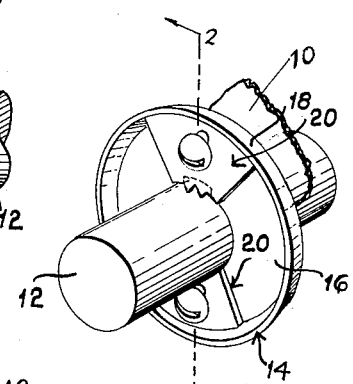
Figure 2:
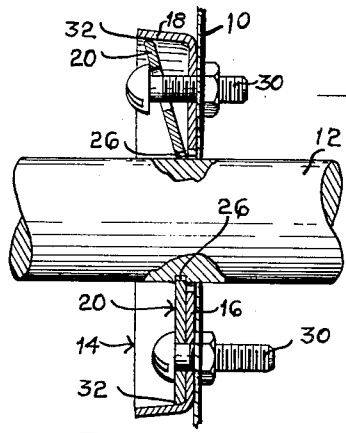
FIGURE 2 is a cross sectional view, taken substantially on the line 2—2 of FIGURE 1.
Figure 3:
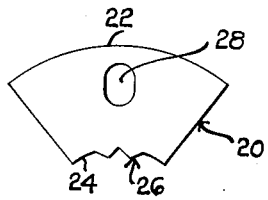
FIGURE 3 is a side elevational view of a sector used in the preferred embodiment.

In FIGURE 4 a modification has been shown, wherein the cup-shaped member 14 is identical to the cup-shaped member shown in FIGURES 1 and 2. Mounted within this cup-shaped member 14, as shown in FIGURES 4 and 5, is a disc-like member 40 provided with a radial slot 42 and a diametrically disposed notch 44. The inner periphery of the disc-like member 40 is provided with a plurality of teeth 46. The disc-like member 40 is provided with a plurality of apertures registering with similar apertures in the bottom of the cup-shaped member 14 for receiving bolts or screws 50. As the nuts 52 are tightened, the cup-shaped member 14 and the disc-like member 40 are drawn toward each other, so as to force the teeth 46 into engagement with the periphery of the surface of the shaft 12, as clearly shown in FIGURE 4, the teeth penetrating the shaft possibly to a lesser degree than the disclosure in FIGURES 1 and 2; but, due to the fact that the number of teeth has been greatly increased, a considerable withholding force is developed by means of this modification.

In the modification disclosed in FIGURE 6, a pair of members 60 that may be identical in shape are each provided with a radial portion 62 and an annular outwardly directed flange portion 64 similar to the flange 18, the outer margins of the flange portions 64 merging into flanges 66 forming the sides of a V-belt pulley. Sectors 20, identical to those shown in connection with the preferred embodiment, are seated within the annular flange portion 64 of one of the members 60, the radial portion 62 corresponding to the bottom portion 16 of the cup-shaped member and the flange portion 64 corresponding to the annular flange 18 of the cup-shaped member. The teeth of the sector 20 are forced into the periphery of the shaft. Upon tightening the nuts 72 upon the bolts 70, the sectors 20 are then forced into the bottom of the cup-shaped cavity of one of the members 60.

In FIGURE 7 another type of V-belt pulley has been shown, wherein a member 80, substantially identical to one of the members 60, is used, together with a disc member 82 having a flange portion 84 forming one side of the V-belt pulley. Sectors 20 in association with bolts 70 and nuts 72 are used to clamp the V-belt pulley to the shaft.

In each of the modifications disclosed herein, the sectors 20 or the disc-like member 40 are subject to a compressive force, forcing the teeth into the periphery of the shaft.

The marginal flange of the cup-shaped portion in each of the modifications shown herein provides a rigid support for the outer convex margin of the section 20 or of the disc-like member 40, as the case may be, so that when the parts are tightened together, the teeth are positively held in engagement with the shaft.

In the event it is desirable to provide a locking device that may be removed from the shaft 12 in either direction, it is necessary either to remove the metal projecting from the shaft due to the teeth gouging the shaft, or to provide a clearance in the bottom member 16. In the modification disclosed in FIGURE 8, notches 90 have been placed in the margins of the aperture for the shaft, so as to provide clearance for the removal of the locking device from the shaft without removing any projection from the shaft caused by the teeth gouging the shaft, that is, the notches 90 provide a clearance for any obstruction on the shaft caused by the teeth.

All of the parts used in forming a lock upon the shaft, with the exception of the bolts and nuts, may be formed by stamping the parts from sheet metal. This results in an inexpensive assembly that is strong and dependable, without the use of expensive machining operations and without the use of castings. These parts could be made from die castings for certain purposes. However, for most purposes, stampings may be used.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention I claim:

1. A locking device for securing a member to a shaft, said locking device including a cup-shaped member, the side wall of the cup-shaped member forming an obtuse angle with respect to the bottom of the cup-shaped member, said cup-shaped member having a hole in the bottom thereof for a shaft, a sector member having a convex outer surface seated against the inner side of the wall of the cup-shaped member, said sector member having teeth in a concave surface opposite the convex surface, said teeth being embedded in the shaft adjacent the bottom of the cup-shaped member to nonrotatably support the cup-shaped member on the shaft and means for fixedly securing the sector member to the cup-shaped member.

2. A locking device functioning as a hub for securing a member to a shaft, said locking device including a cup-shaped member having an apertured wall portion extending in a direction perpendicular to a shaft projecting through said aperture and a side wall portion forming an obtuse angle with respect to the apertured wall, a shaft securing member mounted in compression between the side wall portion and the shaft to lock the shaft to the cup-shaped portion, said shaft securing member being radially and normally disposed with respect to the shaft, and means for holding the shaft securing member in fixed relation with respect to the cup-shaped member.

3. A locking device functioning as a hub for securing a member to a shaft, said locking device including a cup-shaped member having an apertured wall through which aperture the shaft extends, said wall extending radially from the shaft, and a side wall portion forming an obtuse angle with respect to the apertured wall, and a pair of sector members mounted on opposite sides of the shaft, each of said sector members being mounted in compression between the side wall and the shaft, the angular relation between the side wall and the apertured wall being utilized to wedge the sector members against the shaft, the sectors engaging the shaft contiguous to the apertured wall, and means for holding the sector members in fixed relation with respect to the cup-shaped member.

4. A locking device according to claim 3, wherein the sector members are joined together on one side thereof and separated on the opposite side.

5. A locking device according to claim 3, wherein the sector members are provided with teeth embedded in the surface of the shaft.

6. A locking device according to claim 3, wherein the apertured wall is provided with holes radially disposed with respect to the shaft and the sector members are provided with holes registering with the radially disposed holes, and wherein the means for holding the sector members in fixed relation to the cup-shaped member includes threaded bolts clamping the sector members in the cup-shaped housing.

References Cited in the file of this patent

UNITED STATES PATENTS

| | | |
|---|---|---|
| 761,974 | Levedahl | June 7, 1904 |
| 1,982,011 | Michel | Nov. 27, 1934 |
| 2,577,838 | Baldwin | Dec. 11, 1951 |
| 2,689,146 | Werner | Sept. 14, 1954 |
| 2,858,152 | Rifner | Oct. 28, 1958 |